United States Patent
Narendra Trivedi et al.

(10) Patent No.: US 9,852,301 B2
(45) Date of Patent: Dec. 26, 2017

(54) CREATING SECURE CHANNELS BETWEEN A PROTECTED EXECUTION ENVIRONMENT AND FIXED-FUNCTION ENDPOINTS

(71) Applicant: Intel Corporation, Santa Clara, CA (US)

(72) Inventors: Alpa Narendra Trivedi, Hillsboro, OR (US); Siddhartha Chhabra, Hillsboro, OR (US); Uday Savagaonkar, Portland, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,797

(22) Filed: Dec. 24, 2014

(65) Prior Publication Data

US 2016/0188889 A1    Jun. 30, 2016

(51) Int. Cl.
*G06F 21/60* (2013.01)
*G06F 21/62* (2013.01)
*H04L 9/08* (2006.01)

(52) U.S. Cl.
CPC ........ *G06F 21/606* (2013.01); *G06F 21/6218* (2013.01); *H04L 9/0822* (2013.01); *H04L 9/0861* (2013.01)

(58) Field of Classification Search
CPC .......... G06F 21/82; G06F 21/84; G06F 21/85; G06F 21/53; G06F 21/606; G06F 21/0823; H04L 9/0822; H04L 9/0861

USPC ........................................................ 726/189
See application file for complete search history.

(56) References Cited

U.S. PATENT DOCUMENTS

| | | | |
|---|---|---|---|
| 8,190,921 B1 * | 5/2012 | Harwood | G06F 21/6209 713/189 |
| 2003/0235304 A1 * | 12/2003 | Evans | H04N 7/1675 380/216 |
| 2005/0055575 A1 * | 3/2005 | Evans | H04L 41/0809 726/4 |

(Continued)

*Primary Examiner* — Kambiz Zand
*Assistant Examiner* — Tongoc Tran
(74) *Attorney, Agent, or Firm* — Nicholson De Vos Webster & Elliott LLP

(57) ABSTRACT

Embodiments of an invention for establishing secure channels between a protected execution environment and fixed-function endpoints are disclosed. In one embodiment, and system includes an architecturally protected memory, a processing core communicatively coupled to the architecturally protected memory, and a key distribution engine. The processing core is to implement an architecturally-protected execution environment by performing at least one of executing instructions residing in the architecturally protected memory and preventing an unauthorized access to the architecturally protected memory. The key distribution engine is to provide a secure channel between an application executing within the architecturally-protected execution environment and a fixed-function endpoint by generating a decrypted content encryption key by decrypting an encrypted content encryption key using a key wrapping key shared between the processing core and the key distribution engine and providing the decrypted content encryption key to the fixed-function endpoint.

20 Claims, 18 Drawing Sheets

(56) References Cited

U.S. PATENT DOCUMENTS

| | | | |
|---|---|---|---|
| 2005/0100163 A1* | 5/2005 | Buer | G06F 21/72 380/259 |
| 2007/0130470 A1* | 6/2007 | Blom | G06F 21/64 713/181 |
| 2008/0127181 A1* | 5/2008 | Allard | G06F 9/45537 718/1 |
| 2008/0147918 A1* | 6/2008 | Hanebutte | G06F 3/162 710/52 |
| 2010/0188975 A1* | 7/2010 | Raleigh | G06Q 10/06375 370/230.1 |
| 2011/0055299 A1* | 3/2011 | Phillips | G06F 9/45533 707/827 |
| 2011/0145016 A1* | 6/2011 | Eshraghian | G06F 21/6245 705/3 |
| 2011/0252232 A1* | 10/2011 | De Atley | G06F 17/30117 713/165 |
| 2011/0264626 A1* | 10/2011 | Gautam | G06F 17/30445 707/626 |
| 2012/0297200 A1* | 11/2012 | Thom | G06F 21/57 713/189 |
| 2013/0159726 A1* | 6/2013 | Mckeen | G06F 21/72 713/189 |
| 2013/0275769 A1* | 10/2013 | Khosravi | G06F 21/602 713/189 |
| 2015/0295760 A1* | 10/2015 | McBride | H04L 41/0806 370/254 |
| 2017/0039368 A1* | 2/2017 | Grobman | G06F 21/31 |

\* cited by examiner

Bind Key Structure

| Name of Offset | Offset | Size (bytes) | Description | Set by |
|---|---|---|---|---|
| BTID | 0 | 4 | Target device | Software |
| BTSVN | 4 | 4 | Target Security version number. MBZ for display | Software |
| BTPOLICY | 8 | 8 | Target device policy | Software |
| TKEY | 16 | 16 | Target key | Software/Hardware |
| RSVD(0) | 32 | 8 | Reserved | Software |
| SEQID | 40 | 8 | Seed for generating Initialization vector (IV) and value for key wearout protection (KEY_ID) | Hardware |
| MAC | 48 | 16 | MAC on the encrypted key, target ID, policy, and SVN | Hardware |

FIG. 4

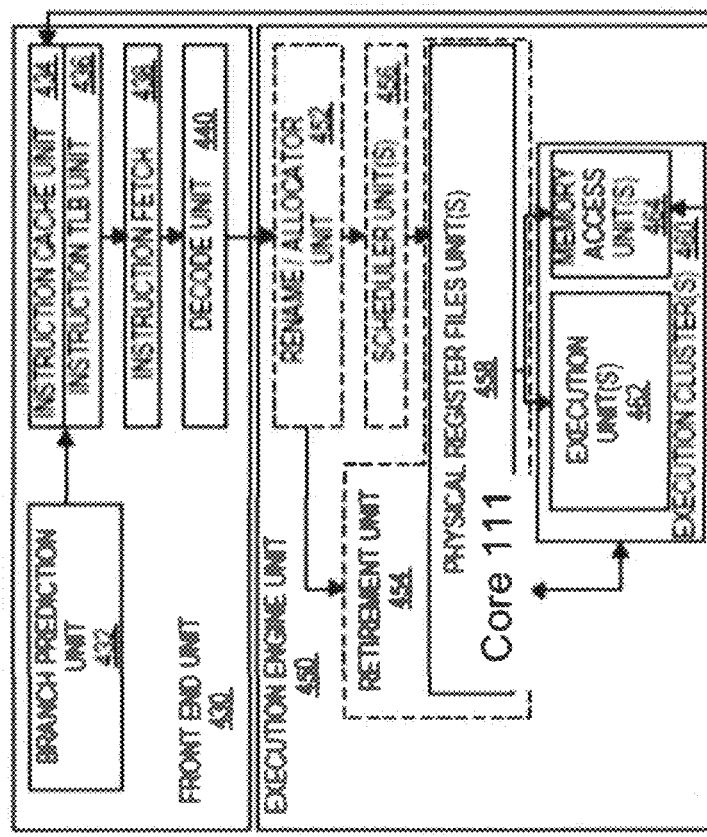
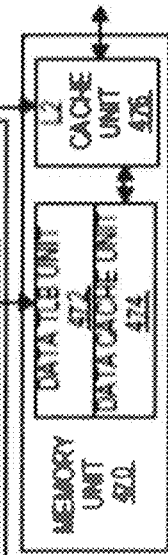
Fig. 7a
Fig. 7b

| STATE | NEXT STATE | CONDITION | DESCRIPTION |
|---|---|---|---|
| RESET | KEYEXP | CPU sets trigger bit in KEY_EXP_TRIG | Reset state of the Unwrap controller. This is the default state when the reset is asserted. |
| KEYEXP | GHASH | Internal indication of key expansion complete | AES Round keys are generated and stored in the Key Bank. |
| GHASH | RUN | Internal indication of ghash complete | Hash Key is generated and stored in the HASH register. The KeyExp busy bit is reset to indicate KDE is ready to accept Unwrap requests. |
| RUN | ARB | Software sets trigger bit in KEY_UNWRAP_TRIG | Acknowledge the Unwrap request. |
| ARB | UNWRAP | Internal arbitration complete signal | This state performs round-robin arbitration to select a device among multiple supported devices, for processing the unwrap request, if multiple unwrap triggers were received by the KDE on the same cycle. |
| UNWRAP | RESPONSE | Internal successful unwrap signal | This state performs the authenticated decryption. For a successful unwrap operation, the state transitions to RESPONSE state and resets the error bit in KDE_ERROR_INFO. |
| UNWRAP | DELAY | Internal unwrap failure signal | This state performs authenticated decryption. For an unsuccessful unwrap operation, the state transitions to RUN state, and does not generate response to the associated device. Also set the error bit in the KDE_ERROR_INFO. |
| RESPONSE | DELAY | Agent confirms receiving the decrypted response | This state generates a response to the associated hardware device to send the unwrapped secure content for a successful unwrap operation. KDE waits in this state for the device to confirm reception of KDE's response over configuration interface. |
| DELAY | RUN | Internal timer saturated indication | State to wait for a fixed number of cycles before programming another set of keys in the same IP, if the IP has any such restrictions |

FIG. 14b

| Field | Size | Source | Description |
|---|---|---|---|
| KWK_0 | 8B | CPU | Key Wrapping Key [63:0]. Shared Key used to wrap the 'secure content' inside the Enclave |
| KWK_1 | 8B | CPU | Key Wrapping Key [127:64]. Shared Key used to wrap the 'secure content' inside the Enclave |
| KEY_EXP_TRIG | 1B | CPU | Bit-0 is set by CPU to trigger Key Expansion. Hardware will reset the bit when Key Expansion complete. |

FIG. 15a

| Field | Size | Source | Description |
|---|---|---|---|
| CIPHERTEXT_0 | 8B | Software | Ciphertext bits [63:0] |
| CIPHERTEXT_1 | 8B | Software | Ciphertext bits [127:64] |
| RSVD | 8B | Software | Reserved |
| SEQID | 8B | Software | Sample from global 64-bit monotonic counter. Seed for generating KEY_ID, IV |
| BT_ID_SVN | 8B | Software | Bind Target Identifier, Bind Target SVN |
| BT_POLICY | 8B | Software | Bind Target Policy. Needed for Auth_header generation |
| MAC_0 | 8B | Software | MAC bits [63:0] |
| MAC_1 | 8B | Software | MAC bits [127:64] |
| KEY_UNWRAP_TRIG | 1B | Software | Bit-0 is set by software to trigger key-unwrap operation. Hardware must reset this bit when unwrap operation is complete |
| KDE_ERROR_INFO | 1B | Software (read-only) | This is a KDE hardware write-only register exposed to software as a read-only MSR to reflect errors associated with an unwrap request. Bit-0: Set for Trigger failures Bit-1: Set for Authentication failures |

FIG. 15b

| STATE | NEXT STATE | CONDITION | DESCRIPTION |
|---|---|---|---|
| PG | PWRUP | KDE receives a wake signal | This is the power-gated state, when KDE is completely turned off. KDE stays in this state until it receives a wake indication from the SoC power-controller unit. |
| PWRUP | PREP | Unwrap state = KEYEXP | This is power-up state of KDE. Wait for Initialization trigger. |
| PREP | RDY | Unwrap state = RUN | This is the KDE-Prep state. In this state, the CPU triggers the Key Expansion sequence internal to KDE. |
| RDY | PWRDN | KDE has been IDLE for SoC specified time period. KDE makes a 'req' to power-down | This is the KDE active state. Software unwrap requests can now be processed by the KDE. |
| PWRDN | PG | KDE receives an 'ack' to power-down. | KDE waits in this state to receive an 'ack' from the SoC power-controller unit. Once the, KDE is ok to power-down, KDE saves required state, i.e. KWK in our microarchitecture and transitions to the PG state. |

FIG. 16b

CREATING SECURE CHANNELS BETWEEN A PROTECTED EXECUTION ENVIRONMENT AND FIXED-FUNCTION ENDPOINTS

TECHNICAL FIELD

The present disclosure is generally related to computer systems, and is specifically related to systems and method for security of computer systems.

BACKGROUND

Confidential information is stored, transmitted, and used by many computer systems. Therefore, techniques have been developed to provide for the secure handling and storing of confidential information. These techniques include various approaches to creating and maintaining a secured, protected, or isolated container, partition, or execution environment within a computer system. Such computer systems may include one or more processors to execute one or more applications within such a container, along with one or more fixed-function endpoints to which confidential information may be desired to be transferred.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 schematically illustrates a data structure providing an input parameter for the EBIND instruction, in accordance with one or more aspects of the present disclosure;

FIGS. 7a-7b schematically illustrate elements of a processor micro-architecture, in accordance with one or more aspects of the present disclosure;

FIG. 14a-14b depict a state-based transition flow of a key wrapping key expansion and a content encryption key unwrapping operation according to an embodiment of the present invention.

FIG. 15a-15b depict a key distribution engine register bank according to an embodiment of the present invention.

FIG. 16a-16b depict a state-based transition flow for powering down a key distribution engine according to an embodiment of the present invention.

DETAILED DESCRIPTION

Figure 1:
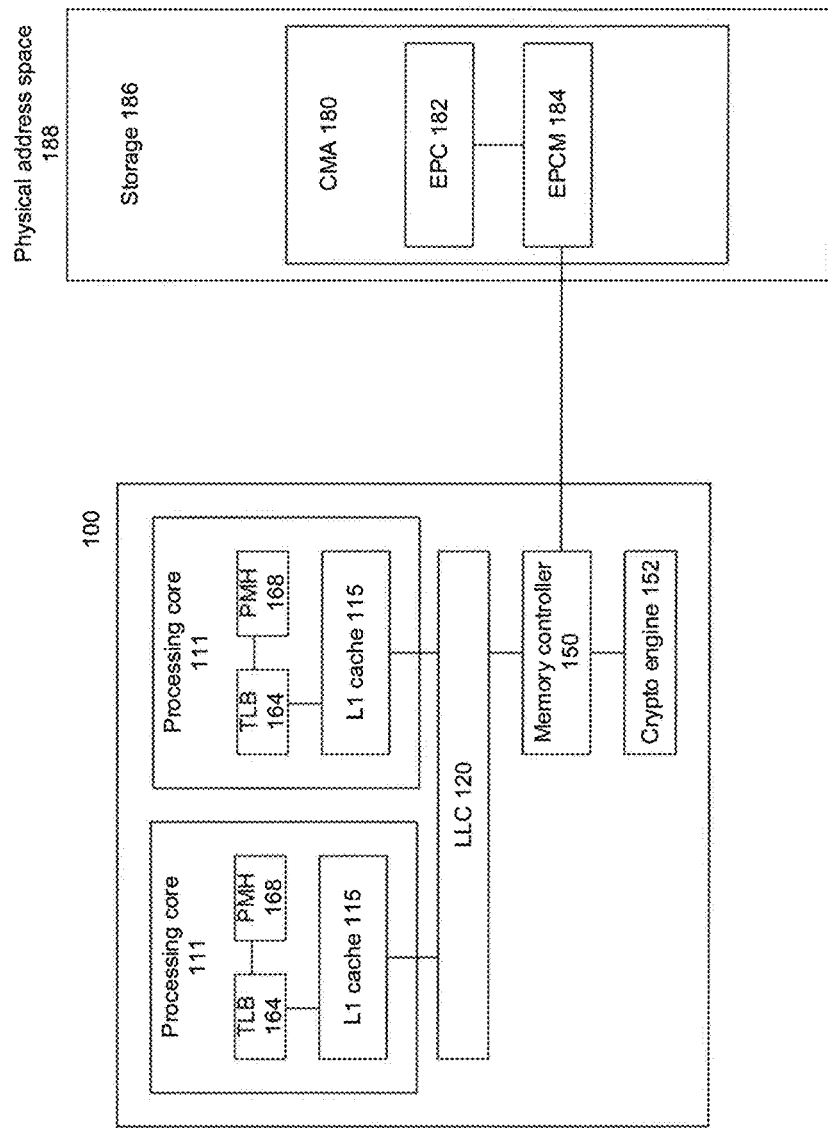
FIG. 1 depicts a high-level component diagram of an example processing system, in accordance with one or more aspects of the present disclosure.

Described herein are processing systems and related methods for secure delivery of information to and from fixed-function endpoints.

Applications being executed and the data accessed by the applications may be protected at the micro-architectural level, e.g., by implementing secure enclaves, as described in more detail below. As various applications may employ fixed-function input, output, and other endpoints to handle security-sensitive information, it may be desired to deliver the information in a secure manner. Examples of such fixed-function endpoints may include audio engines, display engines, and other functional units or devices.

In accordance with one or more aspects of the present disclosure, a processing system may comprise a processing core coupled to an architecturally protected memory. The processing core may comprise a control logic configured to prevent unauthorized access to the architecturally protected memory. The processing core may further comprise an execution logic configured to implement a secure enclave by executing instructions accessing data residing in the micro-architecturally protected memory, as described in more detail below.

An application being executed within the secure enclave may generate a content encryption key and then generate output content encrypted with the content encryption key. The application may store the output content in a memory accessible by a fixed-function endpoint. The application may then encrypt the content encryption key with a key wrapping key, and employ a kernel mode driver to write the encrypted content encryption key into a register or other storage location accessible to a key distribution engine (KDE) as described below. The key wrapping key may be generated by the processor reset microcode, and can be written into the KDE register during the processor reset sequence execution.

The fixed-function endpoint may use the key wrapping key to decrypt the content encryption key, and then use the latter to decrypt the content. Various aspects of the above referenced methods and systems are described in more detail below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanying drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system in accordance with one or more aspects of the present disclosure. As shown in FIG. 1, processing system 100 may include one or more processing cores 111, each processing core 111 having a local first level (L1) cache 115 associated therewith. L1 cache 115 may be communicatively coupled to a shared last level cache (LLC) 120. In an illustrative example, the cache hierarchy comprising L1 cache 115 and LLC 120 may be configured as an inclusive cache hierarchy, such that at least part of the information stored in L1 cache 115 may also be stored in LLC 120.

Figure 6:
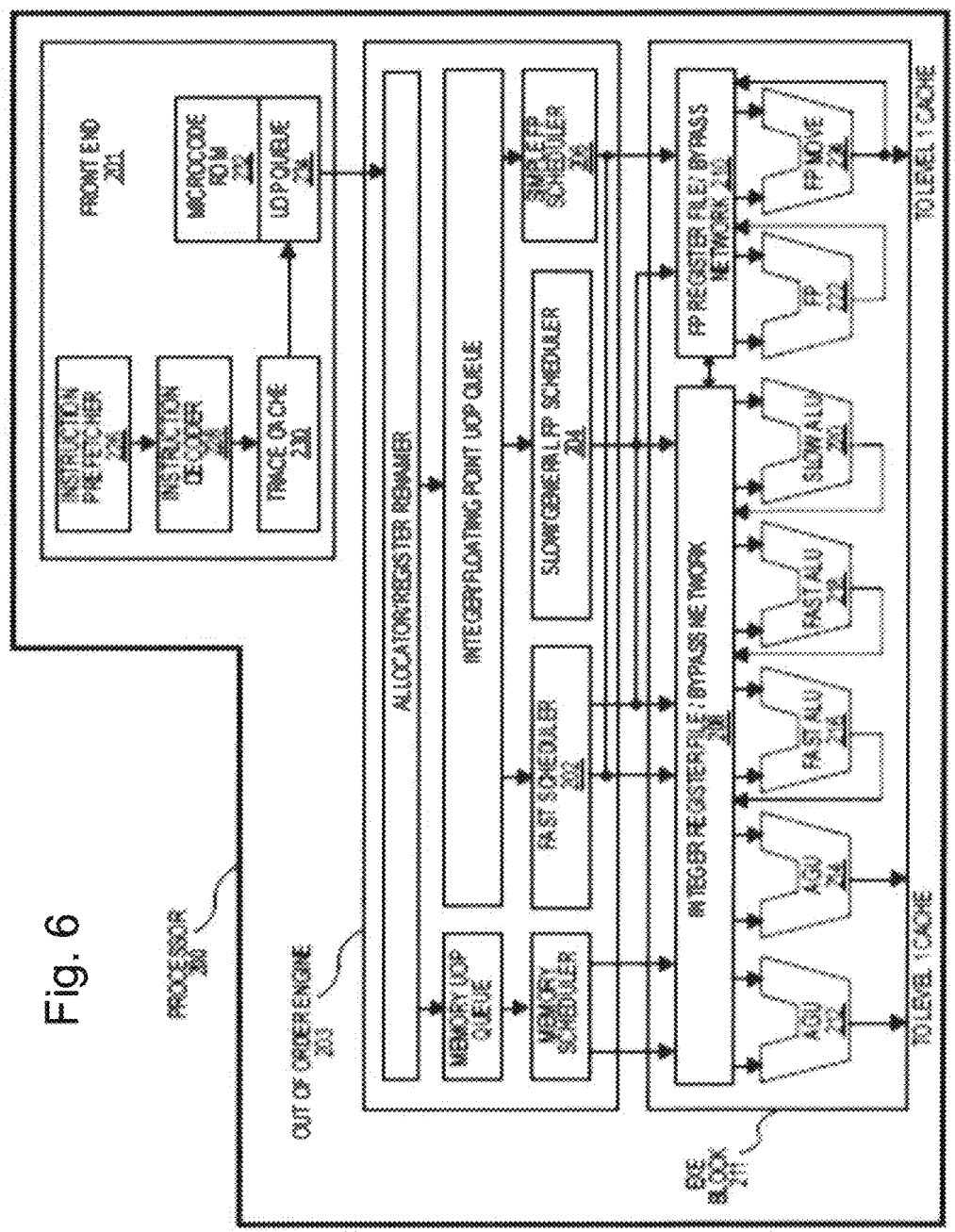
FIG. 6 depicts a block diagram of a processor, in accordance with one or more aspects of the present disclosure.

Processing cores 111 in various implementations may be provided by in-order cores or out-or-order cores. In an illustrative example, processing core 111 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7. In certain implementations, processing system 100 may also include various other components not shown in FIG. 1.

In accordance with one or more aspects of the present disclosure, processing system 100 may further comprise an architecturally protected memory, which in certain implementations may be provided by an enclave page cache (EPC). Processing core 111 may comprise a processing logic configured to implement a secure enclave by executing instructions residing in the protected memory and accessing data residing in the protected memory, while preventing unauthorized access to the protected memory, as described in more details herein below.

"Secure enclave" herein shall refer to a protected sequence of operations accessing a memory protected at the micro-architectural level. Encryption is used to protect the integrity of an active enclave.

An active secure enclave may be divided into an encrypted portion and a decrypted portion. The encrypted portion may reside in an unprotected memory (such as main memory or disk). The decrypted portion resides in the enclave page cache (EPC) 182. The EPC is a secure storage used by the processing system to temporarily store enclave pages when they are not cryptographically protected. Any accesses to the enclave memory pages loaded into the EPC are protected from any modification by software entities outside that enclave. Furthermore, unauthorized parties will not be able to read or modify plain-text data belonging to enclaves that is loaded into the EPC via straight-forward hardware attacks. The EPC is located within the physical address space of the processing system, but can only be accessed using privileged or non-privileged enclave instructions used to build and enable an enclave, enter/exit the enclave, manage EPC, and perform various other operations.

There are several mechanisms of implementing the EPC. The EPC may be implemented as on-die SRAM or eDRAM. Alternatively, the EPC may be constructed by sequestering ways of the CPU's last-level cache. Another mechanism of implementing EPC is a Crypto Memory Aperture (CMA). The CMA provides a mechanism of creating a cryptographically protected volatile storage using the platform dynamic random access memory (DRAM). Various agents may be employed to recognize the memory accesses going to the CMA, and to route those accesses to a cryptographic controller located in the processor. The cryptographic controller, depending on the desired protection level, may generate one or more memory accesses to the platform DRAM to fetch the cipher-text, process the cipher-text to generate the plain-text, and satisfy the original CMA memory request.

Referring again to FIG. 1, L1 cache 115 can transfer data to and from the LLC 120. Memory controller 150 may be connected to the last level cache 120 and attached to the crypto engine 152. Memory controller 150 can assess CMA 180 residing on backing storage device 186 within physical address space 188. CMA 180 may comprise EPC 182 and EPC map 184. The EPC, EPC map, and various other implementation-specific data structures may be mapped to locations inside the CMA. When a request to access the EPC is generated, CMA may remap the request to the backing storage location containing encrypted EPC data, and retrieve the data.

Various enclave-related functions may be implemented in the microcode, supported by the hardware implementations of CMA and the processing logic implementing the enclave functionality. In certain implementations, the processing logic may control access to EPC 182 via TLB 164 and a page miss handler (PMH) 168.

In an illustrative example, a TLB may be implemented as a table mapping virtual addresses to physical addresses. "TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to physical address mapping may be entered into the TLB.

Each TLB entry may include one or more bits indicating or identifying the enclave owning the memory location referenced by the TLB entry. Alternatively, if these bits are not provided, a TLB flush will be needed when exiting the secure enclave to prevent unauthorized access to the EPC. In an illustrative example, if a TLB miss occurs, an extra lookup may fetch data from the EPC map on multiple memory references. The PMH may perform the look up of the EPC map.

Figure 2:
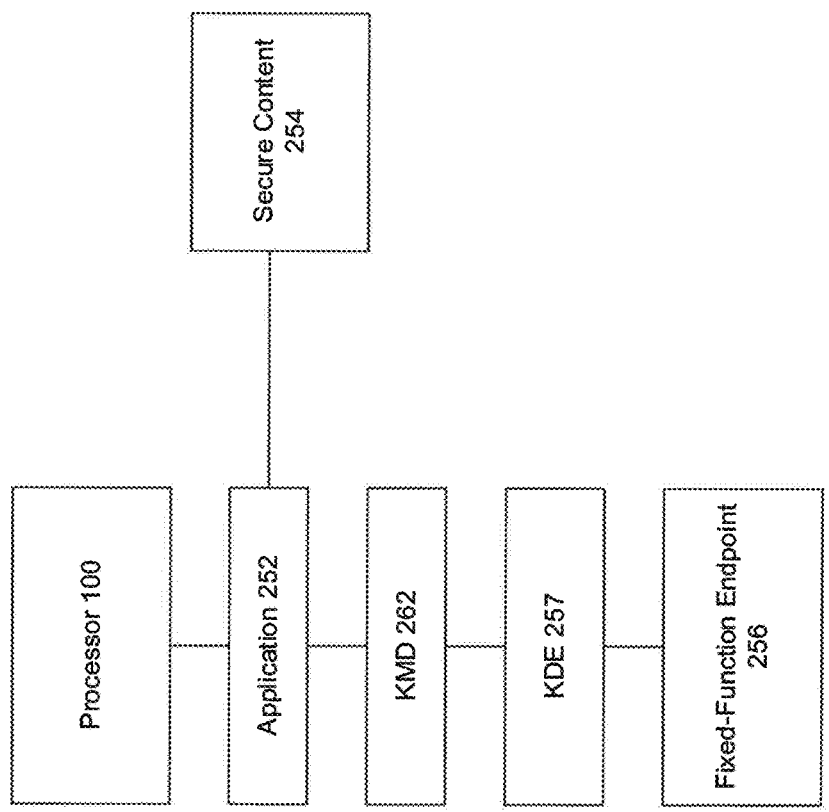
FIG. 2 schematically illustrates a fixed-function endpoint communicatively coupled to an example processing system, in accordance with one or more aspects of the present disclosure.

In various implementations, processing system 100 may be incorporated into a computer system comprising one or more fixed-function endpoints. In an illustrative example, schematically illustrated by FIG. 2, an application 252 being executed within a secure enclave may generate secure content 254 (e.g., audio, video, graphics data, etc.) to be output (e.g., played, displayed, rendered, etc.) or otherwise used by a fixed-function endpoint 256 communicatively coupled to processing system 100 and a key distribution engine 257. A kernel mode driver 262 may be executed in Ring 0 to facilitate communications between applications executing in Ring 3 and KDE 257.

In accordance with one or more aspects of the present disclosure, the application may generate a content encryption key (CEK) and then generate output content encrypted with the CEK. The application may then encrypt the CEK with a key wrapping key (KWK), and write the encrypted (CEK) into a KDE register. The KWK may be generated by the processor reset microcode, and may be written into the KDE register during the processor reset sequence execution. The KDE may use the KWK to decrypt the CEK and provide it to the fixed-function endpoint to use to decrypt the content.

The KWK may be generated by the processor reset microcode, and may be stored in a register within the KDE during the processor reset sequence execution. The KWK may be provided by a sequence of bits having a pre-determined or configurable length. In an illustrative example, a random number generating method may be employed for generating the KWK. Generating the KWK may be implemented in software, hardware, or any combination thereof.

Figure 12:
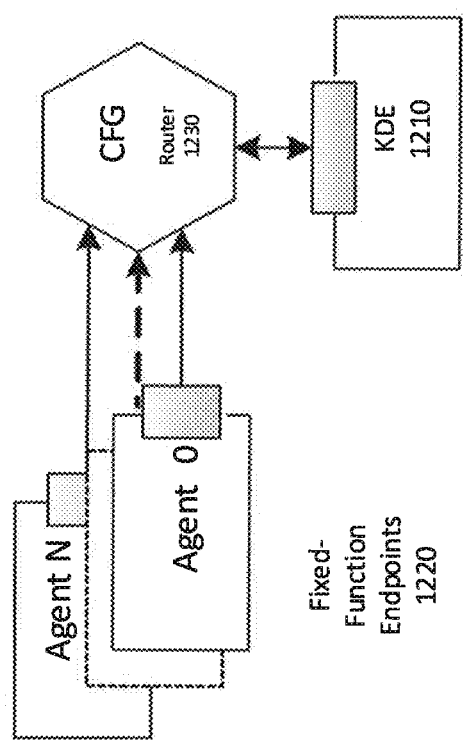
FIG. 12 depicts a key distribution engine to provide for the establishment of any number of secure cryptographic channels between a processor and any number of fixed-function endpoints according to an embodiment of the present invention.

As illustrated in FIG. 12, the use of a KDE 1210 in embodiments of the present invention may provide for the establishment of any number of secure cryptographic channels between a processor and any number of fixed-function endpoint agents 1220. Each such channel may be used to securely transfer a unique CEK to one of the fixed-function endpoint agents, so that each fixed-function endpoint agent may decrypt and/or encrypt content transferred or to be transferred from or to the processor. Therefore, secure communication may be established between the processor and any number of fixed-function endpoint agents without each agent implementing the cryptographic functionality to enable the secure channel setup.

In an embodiment of the present invention in a system-on-a-chip (SOC) platform, intellectual property blocks (IP-blocks) may be used to implement the KDE and any number (0 to N) of fixed-function endpoint agents in the uncore of the SOC. The KDE may be connected via configuration interface 1230 to the agents, where each such agent may be a hardware device capable of receiving and/or sending content from and/or to a secure enclave supported by a core on the SOC. For example, one of agents 1220 may represent a display engine to which an encrypted surface may be sent through a device driver stack.

Figure 13:
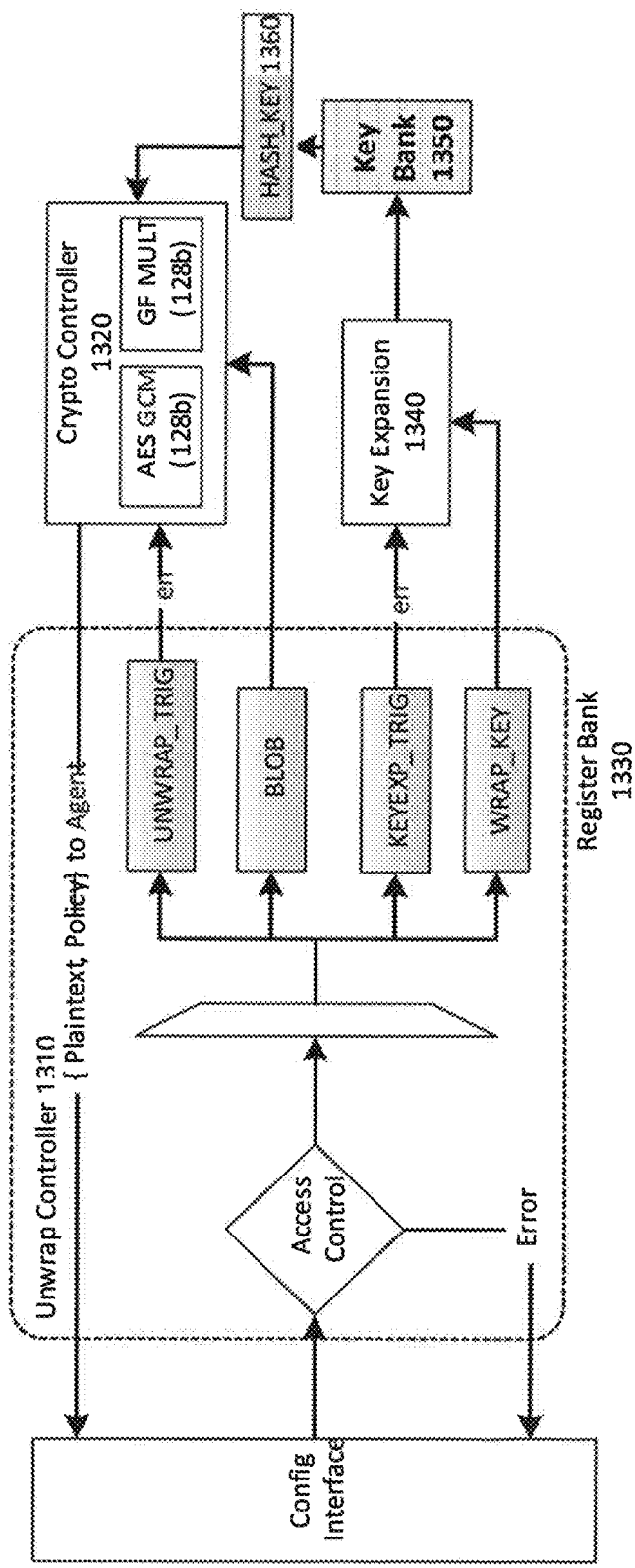
FIG. 13 depicts a block diagram of a key distribution engine according to an embodiment of the present invention.

FIG. 13 depicts a block diagram of a KDE 1300 according to an embodiment of the present invention. KDE 1300 includes unwrap controller 1310, crypto controller 1320, register bank 1330, key expansion module 1340, and key bank 1350. KDE 1300 may be implemented completely in hardware and may be completely powered-down when idle, as described below.

Unwrap controller 1310 may include a state machine or other logic or hardware to control the operation of KDE 1300, including decrypting or unwrapping a symmetric, encrypted CEK and providing it to a fixed-function endpoint for the fixed-function endpoint to use to decrypt encrypted content. Unwrap controller 1310 may cause KDE 1300 to perform or participate in the performance method embodiments of the present invention, such as the method embodiment illustrated in FIG. 3. The operation of KDE 1300 to decrypt a CEK using a KWK may be referred to as a key unwrapping operation.

In an embodiment, unwrap controller 1310 recognizes and/or decodes a request for a key unwrapping operation and invoking the sub-modules of KDE 1300 to perform KWK expansion and CEK unwrapping operations according to the state-based transition flow shown in FIG. 14*a* and FIG. 14*b* and described below.

Unwrap controller 1310 is also responsible for interfacing with the configuration interface of the SOC and packetizing/de-packetizing the master/target transactions. It also enforces hardware-based access-control to ensure confidentiality/integrity of communication between the KDE and the fixed-function endpoints. In response to detecting an access violation, the KDE rejects the requested operation and programs the KDE_ERROR_INFO register (described below) to indicate the failure to complete the request.

Register bank 1330 may include registers or storage locations accessible only by hardware, for example by a core in an SOC, and registers or storage locations accessible by software. The hardware-accessible registers may include those shown in FIG. 15*a* and the software-accessible registers may include those shown in FIG. 15*b*.

Register bank 1330 may include hardware-accessible registers KWK_0, KWK_1, and KEY_EXP_TRIG as shown in FIG. 15*a*. KWK_0 and KWK_1 may provide for a processor or core to share a secret key, e.g., a key wrapping key (KWK), with the KDE. For example, the core may generate the KWK by sampling a digital random number generator, as described above, and store it in a key register in the core and in KWK_0 and KWK_1. To protect the secrecy of the KWK, KWK_0 and KWK_1 may be cleared and a new KWK must be generated in connection with software-visible power transitions, but may be saved to and restored from a secure non-volatile location in connection with software-invisible power transitions.

Register bank 1330 may also include hardware-accessible register KEY_EXP_TRIG as shown in FIG. 15*a*. KEY_EXP_TRIG register may be set by hardware, e.g., by a core during a reset process after a KWK has been generated and stored in KWK_0 and KWK_1, to trigger key expansion by key expansion module 1340 as described below.

Register bank 1330 may also include multiple sets of the software-accessible registers shown in FIG. 15*b*, with one set for each fixed-function endpoint agent 0 to N. Each set may be referred to as a REG_STRUCT, a REG_STRUCT register, or a REG_STRUCT register set, where a REG_STRUCT may also refer to the data blob, including an encrypted content encryption key, to be programmed into a set of such registers to set up the KDE to perform a key unwrapping operation. This data blob may be generated by the use of an EBIND instruction (as described below) in an application or device driver running in secure enclave, and programmed into a REG_STRUCT register set by the device driver.

After the device drivers programs a REG_STRUCT register set with the REG_STRUCT data, it may set the corresponding KEY_UNWRAP_TRIG bit to trigger a key unwrap operation. The result of the trigger request and/or key unwrap operation may be indicated in the corresponding KDE_ERROR_INFO register, which may be writable by hardware (e.g., unwrap controller 1310) and read-only by software.

Key expansion module 1340 may include circuitry and/or other hardware to expand the KWK from KWK_0 and KWK_1 into round keys for an encryption/decryption algorithm such as an Advanced Encryption Standard Galois/Counter Mode (AES-GCM) algorithm. The operation of key expansion module 1340 may be triggered by the setting of bit 0 of the KEY_EXP_TRIG register, e.g., by a core during a reset process after a KWK has been generated and stored in KWK_0 and KWK_1. Bit 0 of the KEY_EXP_TRIG may be cleared by unwrap controller 1310 upon completion of key expansion to indicate that the round keys are available for use in a key unwrapping operation. Therefore, round keys may be generated and stored in key bank 1350 in advance of a key unwrapping request. Key expansion module 1340 may also generate a hash key, for example, based on $H=E(K,0^{\wedge}128)$, and stored in the HASH_KEY register.

Key bank 1350 may include flip-flops or any other storage locations in which to store round keys generated by key expansion module 1340 and used by crypto controller 1320. In an embodiment, key bank 1350 may be a ten by 128 bit array. Key bank 1350 may be cleared in connection with software-visible power transitions, but, in connection with software-invisible power transitions, may be saved to and restored from a secure non-volatile location or retained in the KDE using a voltage rail that stays on during the power transition.

Crypto controller 1320 may include circuitry and/or hardware to execute any one or more encryption/decryption algorithms, such as a 128-bit Advanced Encryption Standard Galois/Counter Mode (AES-GCM) algorithm, using the round keys from key bank 1350. Crypto controller 1320 may operate in response to control signals from unwrap controller 1310 to decrypt an encrypted CEK.

In an embodiment, crypto controller 1320 may be optimized for minimal area instead of performance because KDE 1300 is not expected to be used often (since the same unwrapped CEK may be re-used) or be in a critical timing path. An embodiment may include a single AES engine and a single Galois Field multiplier, or an embodiment may include multiple pipelined engines for higher performance.

Figure 16A:
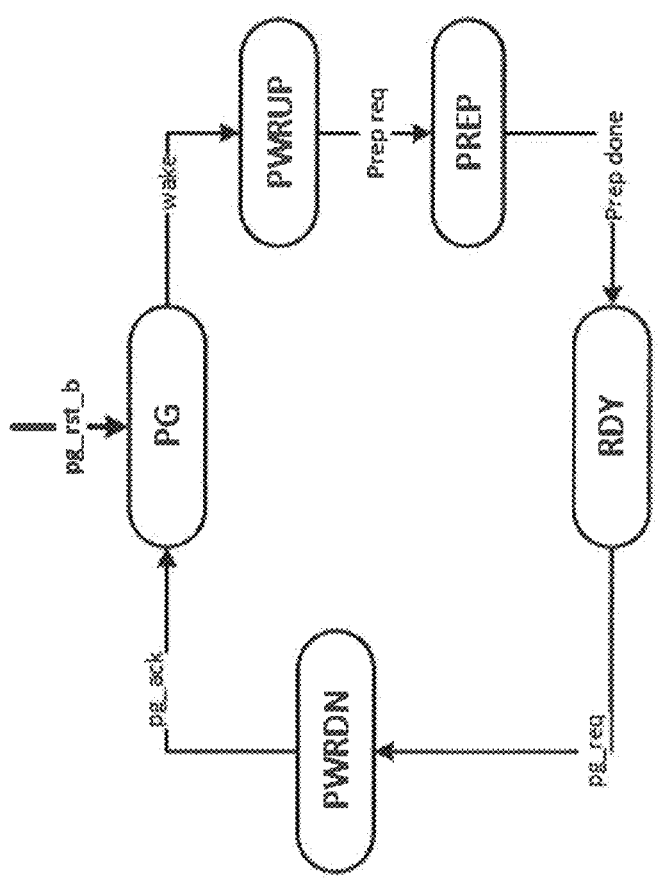

KDE 1300 may be powered down when idle, for example, according to the state-based transition flow shown in FIG. 16*a* and FIG. 16*b*. In an embodiment, after KDE 1300 has been idle for a given period of time, it may send a power-down request to a power controller in the SOC. In response to receiving an acknowledgment of the request from the power controller, KDE 1300 may save state, such as the contents of KWK_0 and KWK_1, (or retain it in the KDE using a voltage rail that stays on during the power transition) and transition to a powered-down state.

Figure 14A:
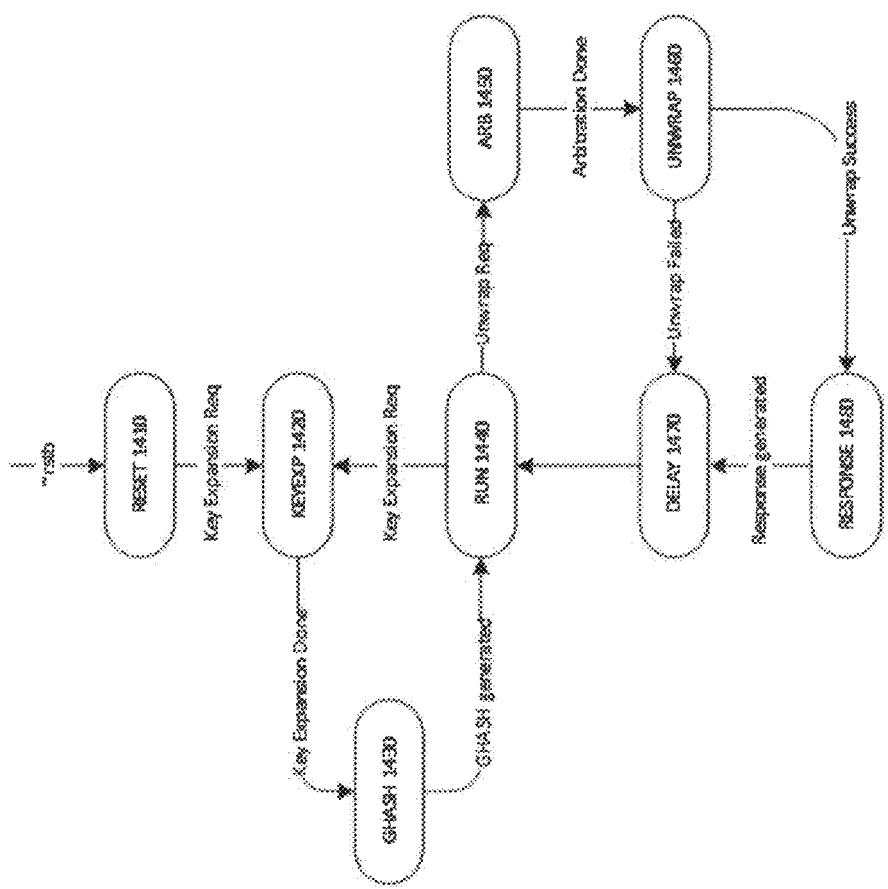

FIGS. 14*a* and 14*b* depict a state-based transition flow that, in an embodiment of the present invention, may be implemented by a state machine in unwrap controller 1310. The state machine may be reset into reset state 1410.

In response to a key expansion request (e.g., the setting of a KEY_EXP_TRIG bit in register bank 1330), the state machine may transition to KEYEXP state 1420, in which a KWK may be expanded into round keys (e.g., by key expansion module 1340 in response to one or more control signals from unwrap controller 1310) and stored them in key bank 1350. In response to the completion of key expansion (e.g., the clearing of the KEY_EXP_TRIG bit), the state machine may transition to GHASH state 1430, in which a hash key may be generated (e.g., by key expansion module 1340 in response to one or more control signals from unwrap controller 1310) and stored in a HASH_KEY register 1360. In response to the completion of the generation of the hash key, the state machine may transition to RUN state 1440.

From RUN state 1440, the state machine may transition back to KEYEXP state 1420 in response to another key expansion request, or it may transition to ARB state 1450 in response to a unwrap request (e.g., the setting of a KEY_UNWRAP_TRIG bit in register bank 1330). In ARB state 1450, round robin arbitration may be performed to select one of multiple devices for which to perform an unwrap operation if multiple unwrap requests are active at the same time. In response to a signal that this internal arbitration is complete, the state machine may transition to UNWRAP state 1460, in which unwrapping of an encrypted CEK (e.g., by crypto controller 1320 in response to one or more control signals from unwrap controller 1310) may be performed.

From UNWRAP state 1460, the state machine may transition to RESPONSE state 1480 in response to the successful completion of the unwrap operation, then to DELAY state 1470 in response to receiving an acknowledgement (as further described below), then back to RUN state 1440 in response to the expiration of a delay timer. Alternatively, from UNWRAP state 1460, the state machine may transition to DELAY state 1470 in response to an error during the unwrap operation, then back to RUN state 1440 in response to the expiration of the delay timer.

A transition to RESPONSE state 1480 may result in the clearing (if previously set) of a KDE_ERROR bit in register bank 1330. In RESPONSE state 1480, the decrypted CEK may be sent to the endpoint, and the state machine may wait until receiving an acknowledgement (e.g., through configuration interface 1230) that the endpoint has received the decrypted CEK.

A transition to DELAY state 1470 directly from UNWRAP state 1460 may result in the setting of the KDE_ERROR bit to indicate that the unwrap operation has not completed successfully.

Figure 3:
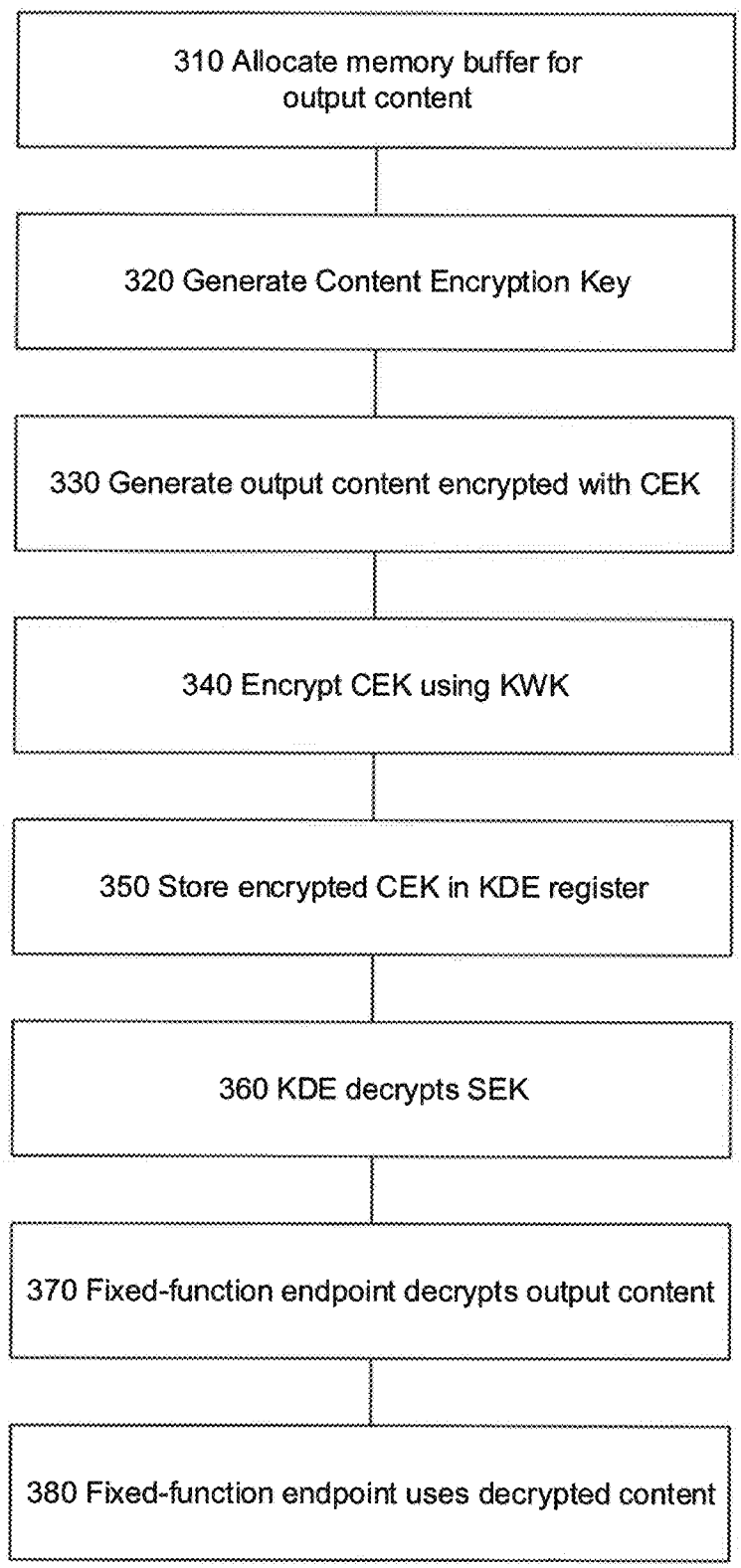
FIG. 3 depicts a flow diagram of an example method for secure delivery of information to the fixed-function endpoint, in accordance with one or more aspects of the present disclosure.

FIG. 3 depicts a flow diagram of an example method for secure delivery of content to a fixed-function endpoint (which may be, for example, a display device), in accordance with one or more aspects of the present disclosure. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its functions, routines, subroutines, or operations may be performed by one or more physical processors of the computer system executing the method. Two or more functions, routines, subroutines, or operations of method 300 may be performed in parallel or in an order which may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In one example, as illustrated by FIG. 3, method 300 may be performed by the computer systems described herein below and illustrated by FIGS. 5-11.

Referring to FIG. 3, at block 310, an application being executed within an architecturally protected execution environment of a processing system allocate one or more memory buffers for storing encrypted output content. As the buffers are intended for storing encrypted data, they need not be allocated within an architecturally protected memory (such as EPC), and thus may be allocated within the platform DRAM.

In certain implementations, the protected execution environment may comprise one or more memory pages protected at the micro-architectural level. In an illustrative example, the micro-architecturally protected execution environment may be provided by a secure enclave.

At block 320, the application may generate a content encryption key. In an illustrative example, the content encryption key may be generated using an instruction (e.g., RDRAND) that returns random numbers from an on-chip random number generator. In certain implementations, the random number generator may be compliant with various security and cryptographic standards such as NIST SP800-90, FIPS 140-2, and ANSI X9.82. Since the content encryption key is generated inside the secure enclave, it resides in the EPC, and thus is protected from tampering.

At block 330, the application may generate output content encrypted with the content encryption key. The encryption method employed to encrypt the output content may be implementation-specific, including software-only, hardware-only, and hardware-assisted software implementations. The encrypted output content may be stored in the previously allocated memory buffers, as described with references to block 310 herein above.

At block 340, the application may encrypt the content encryption key using the key wrapping key. In certain implementations, the content encryption key may be encrypted and bound to a policy specifying the interfaces which may be employed by the fixed-function endpoint for using the output content encrypted with the content encryption key.

In an illustrative example, a new instruction, EBIND, may implemented for encrypting a key and binding it to a policy. The encrypted blob may only be decrypted by the KDE using the key wrapping key. In certain implementations, producing an encrypted key by EBIND instructions and binding the encrypted key to a policy as described herein, may be employed for performing a key exchange between a processor and various external devices, including, e.g., input/output devices.

The encrypted key may be produced by the EBIND instruction based on the input BIND_STRUCT structure specified as an input parameter for the instruction: EBIND BIND_STRUCT. The BIND_STRUCT structure may comprise a target device identifier, a target security version number, a target device policy, a content encryption key to be encrypted, and/or various other fields as schematically illustrated by FIG. 4.

The target device policy specifying the allowed interfaces for using the output content may be provided by a bit sequence, for example, if the endpoint is a display device. Various types of interfaces may be assigned fixed positions within the bit sequence encoding the policy, wherein a set bit may indicate that the corresponding interface is allowed, while a zero bit may indicate that the corresponding interface is not allowed for using the output content encrypted with the content encryption key to which the policy is bound. Various types of interfaces specified by the policy may include, e.g., integrated interfaces (such as a screen integrated into a laptop, a cell phone, or a tablet computer), memory-based interfaces (such as WIDI or USB interfaces), and/or HDMI interfaces with or without HDCP support.

Referring again to FIG. 3, at block 350, the application may invoke a kernel mode driver to store the encrypted content encryption key in a KDE register, and to signal the fixed-function endpoint that secure content is ready for use.

At block 360, the KDE may decrypt the content encryption key using the key wrapping key that has been programmed during the processor reset sequence as described in more details above. In order to minimize the hardware complexity of the fixed-function endpoint, the cryptographic hardware logic needed to implement the key wrapping methods described herein resides in the KDE. The KDE unwraps the content encryption key and provides it to the fixed-function endpoint.

At block 370, the fixed-function endpoint may decrypt the content using the content encryption key.

At block 380, the fixed-function endpoint may use the content. Such use may include transmission protected by any known protection technique (e.g., High-bandwidth Digital Content Protection or HDCP) and/or any known security policy (e.g., according to which the fixed-function endpoint would destroy the content encryption/decryption key responsive to detecting an attempted configuration change or the expiration of a pre-defined or dynamically configurable key expiration period).

Upon completing the operations schematically described by block 380, the method may terminate.

Thus, the systems and methods described herein provide end-to-end security for applications being executed within protected execution environments (such as secure enclaves) and providing their output to fixed-function endpoints.

While the description herein references a single protected session involving a single fixed-function endpoint, the systems and methods described herein may also be used to support multiple concurrent protected sessions involving one or more fixed-function endpoints. The KDE may be configured to maintain several registers for storing an encrypted CEK for each session (assuming that different sessions involve encrypting content with a different CEK, otherwise a single encrypted CEK may be decrypted and programmed into an endpoint for use during more than one session).

While for various use cases confidentiality of the content may be sufficient, other use cases may also require a protection against a replay attack, i.e., against an attempt to maliciously repeat a valid encrypted content transmission. To implement the replay protection, a secure application may generate a content encryption key for each package of content by applying a key derivation function to a random number value and a counter: CEK=KeyFn(RDRAND, counter), wherein CEK is the content encryption key, RDRAND is a random number (produced, e.g., by RDRAND instruction), and counter is the counter maintained locally by the application and incremented every time an content package has been generated and encrypted.

The generated key may be used by the secure application to encrypt the content to be stored in a memory buffer accessible by the fixed-function endpoint, as described in more detail above with reference to block 330 of FIG. 3. The secure application may then encrypt the RDRAND value using the key wrapping key and store the encrypted blob in a KDE register, as described in more detail above with reference to block 330 of FIG. 3. Upon receiving the encrypted blob, the KDE may decrypt the RDRAND value. The KDE may then generate the content encryption key by applying the key derivation function to the RDRAND value and a locally maintained counter. The latter may be maintained by the KDE and incremented each time a content package has been decrypted.

The monotonically increasing counter maintained by the KDE ensures that an attacker cannot replay content packages. If an attacker replays a previously content package, the value of the counter in the KDE will not match the value of the counter that was used by the secure application to generate the content encryption key for the content. Hence, the content encryption key generated by the KDE will be different from the key that was used to encrypt the content, thus effectively preventing the attempted replay attack.

In certain implementations, to provide the means for the KDE to detect a possible de-synchronization between the counters maintained by the secure application and by the KDE, the secure application may employ the kernel mode driver to transmit the counter value to the KDE. The KDE may compare the received counter value with the value of the locally maintained counter, and only decrypt the content if the two counter values match.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 5:
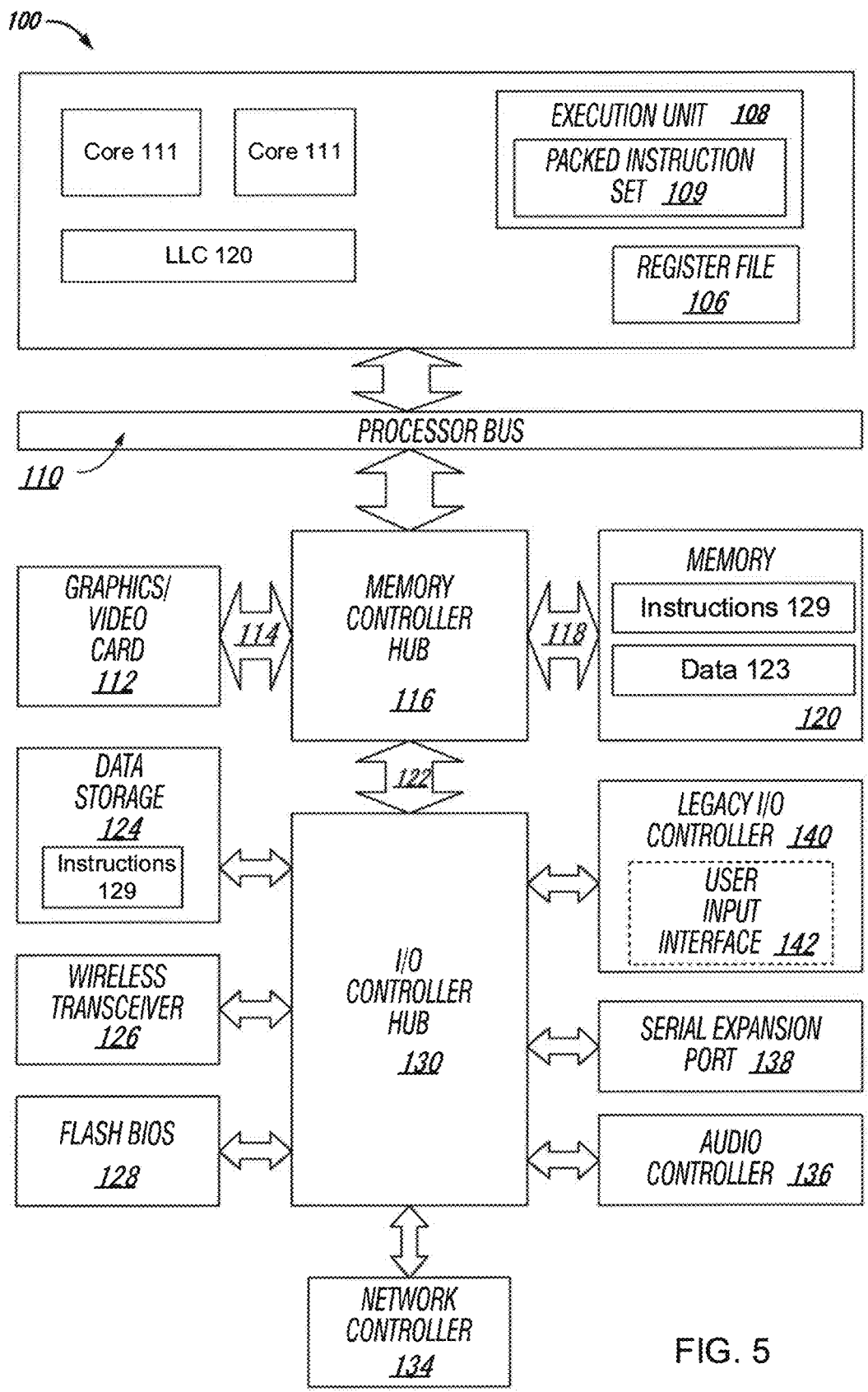
FIG. 5 depicts a high-level component diagram of an example computer system, in accordance with one or more aspects of the present disclosure.

FIG. 5 depicts a high-level component diagram of one example of a computer system in accordance with one or more aspects of the present disclosure. A computer system 100 may include a processor 110 to employ execution units including logic to perform algorithms for processing data, in accordance with the embodiment described herein. System 100 is representative of processing systems based on microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 110 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 110 includes a Level 1 (L1) internal cache. Depending on the architecture, the processor 110 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 110. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110. For one embodiment, execution unit 108 includes logic to handle a packed instruction set 109. By including the packed instruction set 109 in the instruction set of a general-purpose processor 110, along with associated circuitry to execute the instructions, the operations used by many multimedia applications may be performed using packed data in a general-purpose processor 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 110 may further include a cache control logic 124.

System 100 includes a memory 120. Memory 120 includes a dynamic random access memory (DRAM) device, a static random access memory (SRAM) device, flash memory device, or other memory device. Memory 120 stores instructions 129 and/or data 123 represented by data signals that are to be executed by the processor 110. In certain implementations, instructions 129 may include instructions employing the cache control logic 124 for managing shared cache.

A system logic chip 116 is coupled to the processor bus 110 and memory 120. The system logic chip 116 in the illustrated embodiment is a memory controller hub (MCH). The processor 110 can communicate to the MCH 116 via a processor bus 110. The MCH 116 provides a high bandwidth memory path 118 to memory 120 for instruction and data storage and for storage of graphics commands, data, and textures. The MCH 116 is to direct data signals between the processor 110, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 110. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Various embodiments of the present invention may be used in a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 6 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIGS. 7a-7b schematically illustrates elements of a processor micro-architecture, in accordance with one or more aspects of the present disclosure. In FIG. 7a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 7b, arrows denote a coupling between two or more units and the direction of the arrow indicates a direction of data flow between those units. FIG. 7b shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 8:
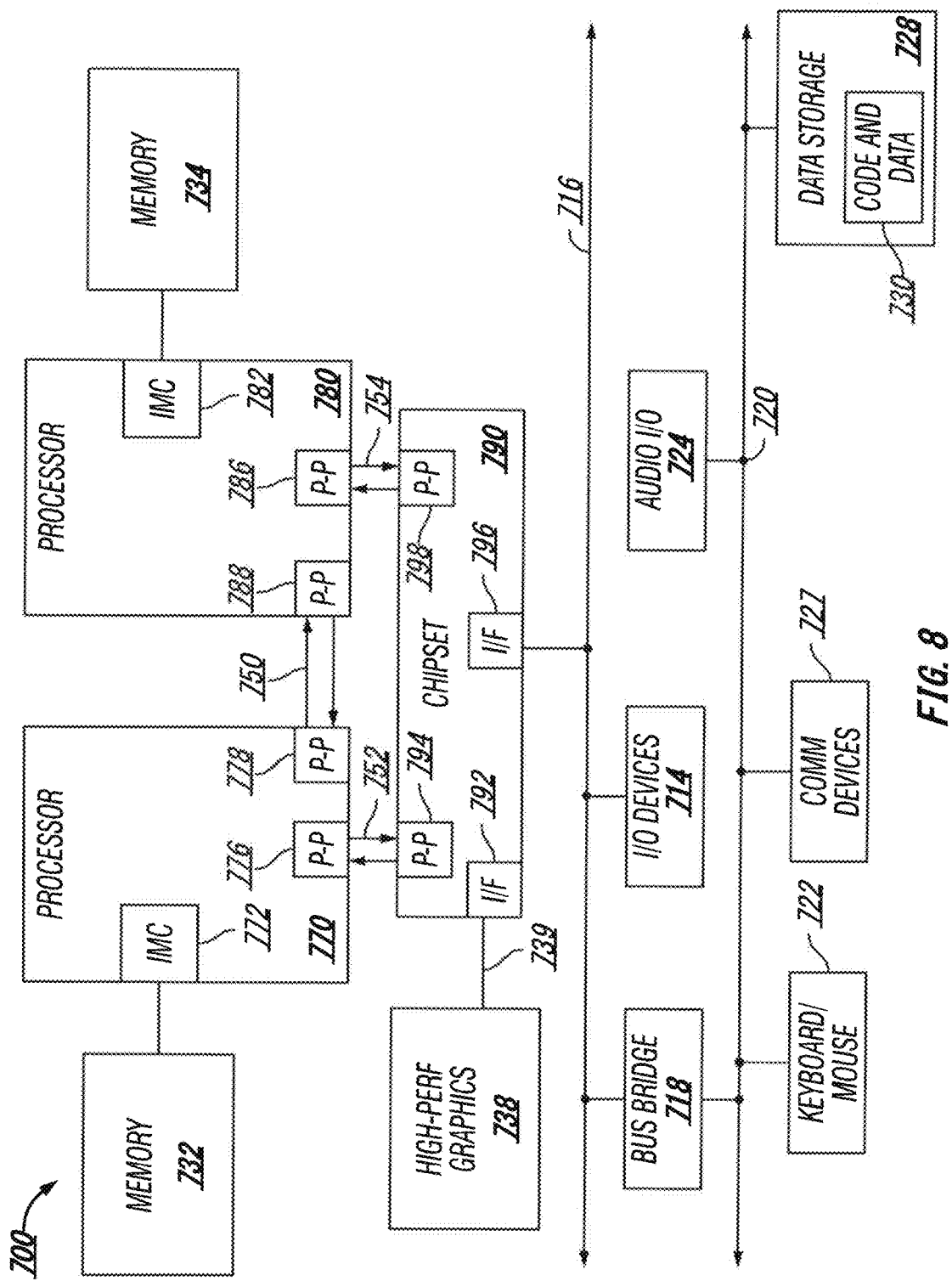
FIG. 8 depicts a block diagram of an example computer system, in accordance with one or more aspects of the present disclosure.

FIG. 8 depicts a block diagram of an example computer system, in accordance with one or more aspects of the present disclosure. As shown in FIG. 8, multiprocessor system 700 is a point-to-point interconnect system, and includes a first processor 770 and a second processor 780 coupled via a point-to-point interconnect 750. Each of processors 770 and 780 may be some version of processing system 100 capable of performing secure delivery of content to and from fixed-function endpoints, as described in more detail above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 8, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 8, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 9:
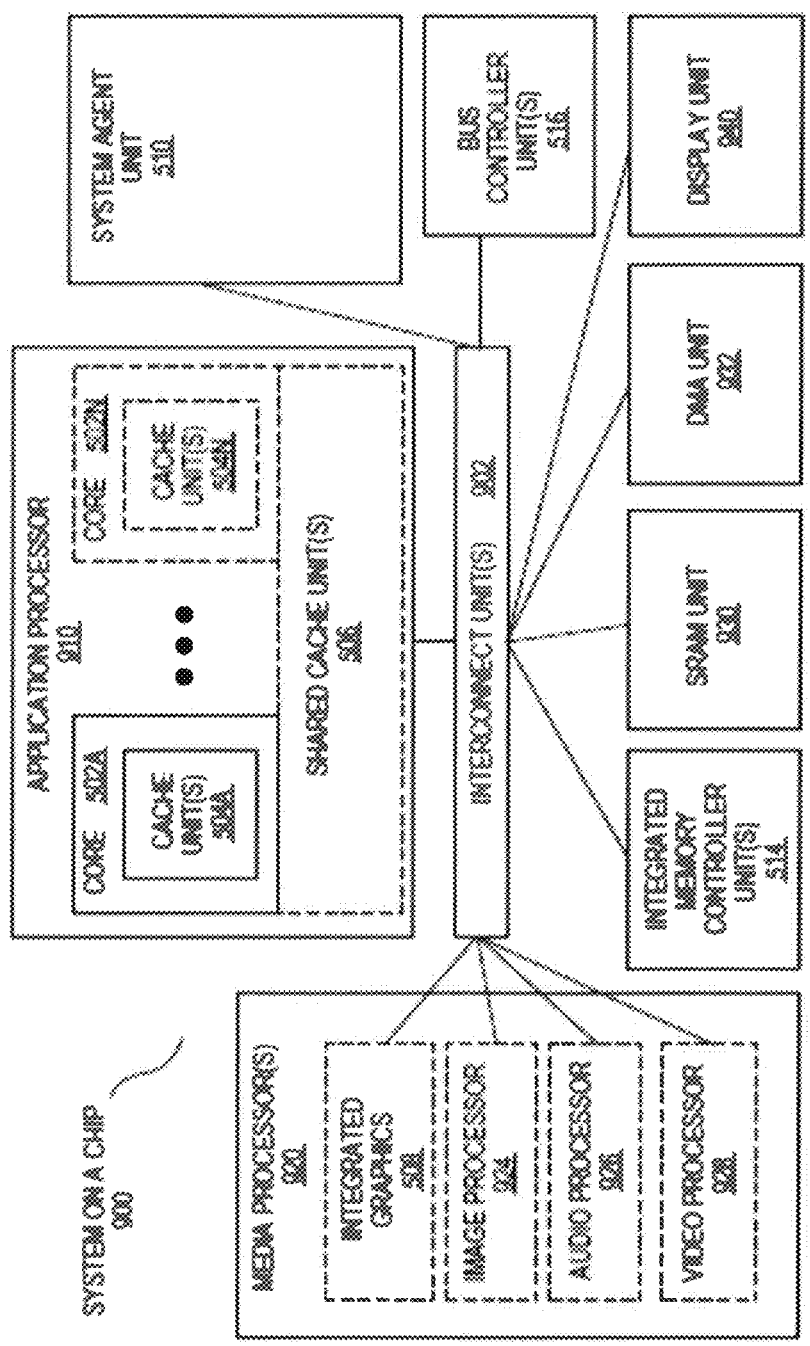
FIG. 9 depicts a block diagram of an example system on a chip (SoC), in accordance with one or more aspects of the present disclosure.

FIG. 9 depicts a block diagram of an example system on a chip (SoC), in accordance with one or more aspects of the present disclosure. The application processor 910 provided by some version of processing system 100 capable of performing secure delivery of content to and from fixed-function endpoints, as described in more details herein above. As schematically illustrated by FIG. 9, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
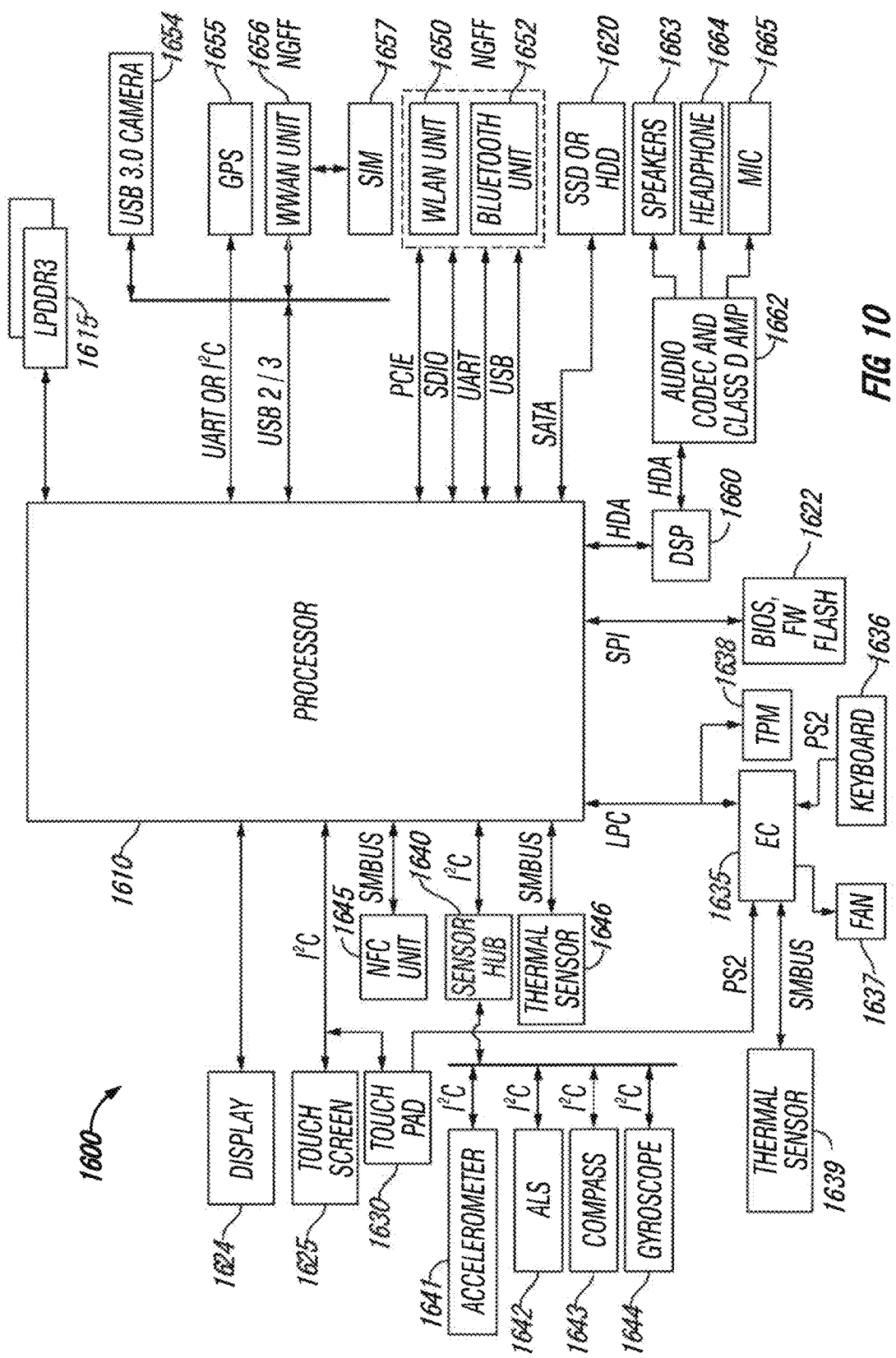
FIG. 10 depicts a block diagram of an example computer system, in accordance with one or more aspects of the present disclosure.

FIG. 10 depicts a block diagram of an example computer system, in accordance with one or more aspects of the present disclosure. Processor 1610 may be provided by some version of processing system 100 capable of performing secure delivery of content to and from fixed-function endpoints, as described in more detail above.

The system 1600 schematically illustrated by FIG. 10 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 10 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 10, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 11:
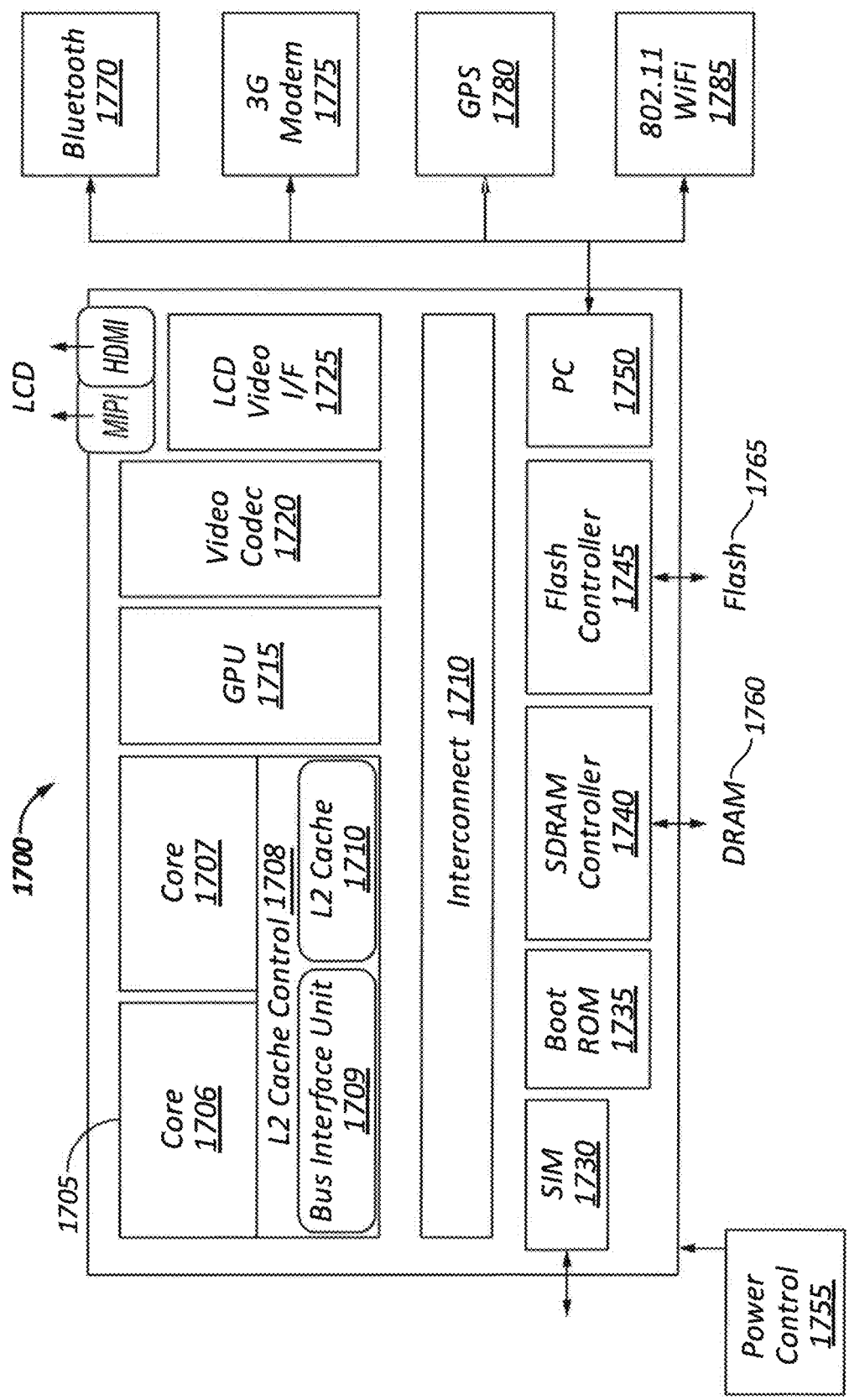
FIG. 11 depicts a block diagram of an example system on a chip (SoC), in accordance with one or more aspects of the present disclosure.

FIG. 11 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 11, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system comprising:
an enclave page cache; and
a processing core communicatively coupled to the enclave page cache, the processing core including hardware to control access to the enclave page cache, the processing core to implement an architecturally-protected execution environment by performing at least one of executing instructions residing in the enclave page cache and preventing an unauthorized access to the enclave page cache, the architecturally-protected execution environment to execute an application to generate an encrypted content encryption key;
a key distribution engine to provide a secure channel between the application executing within the architecturally-protected execution environment and a first fixed-function endpoint by generating a first decrypted content encryption key by decrypting the encrypted content encryption key using a key wrapping key shared between the processing core and the key distribution engine and providing the first decrypted content encryption key to the first fixed-function endpoint; and
a configuration interface between the key distribution engine and the first fixed-function endpoint and a second fixed-function endpoint, the configuration interface to receive an acknowledgement from the first fixed-function endpoint that the first fixed-function endpoint has received the first decrypted content encryption key, wherein the acknowledgement is to be received by a state machine in the key distribution engine before a transition to a state in which a second decrypted content encryption key is to be provided to a second fixed-function endpoint.

2. The processing system of claim 1, wherein the key distribution engine includes a first register in which to store the key wrapping key, the first register accessible only by hardware.

3. The processing system of claim 2, wherein the key distribution engine also includes a second register in which to store the encrypted content encryption key, the second register accessible by software.

4. The processing system of claim 3, wherein the key distribution engine also includes a key expansion module to expand the key wrapping key into a plurality of round keys.

5. The processing system of claim 4, wherein the key distribution engine also includes a key bank in which to store the plurality of round keys.

6. The processing system of claim 5, wherein the key distribution engine also includes a crypto controller to decrypt the encrypted content encryption key with the plurality of round keys.

7. The processing system of claim 6, wherein the key distribution engine also includes an unwrap controller to control the key expansion module and the crypto controller.

8. The processing system of claim 7, wherein the key distribution engine also includes a third register in which to store a first indicator to trigger the crypto controller to decrypt the encrypted content encryption key, the third register accessible by software.

9. The processing system of claim 8, wherein the key distribution engine also includes a fourth register in which to store a second indicator to trigger the key expansion module to expand the key wrapping key, the fourth register accessible only by hardware.

10. A method comprising:
implementing, by a processor, an architecturally protected execution environment by performing at least one of executing instructions residing in an enclave page cache and preventing an unauthorized access to the enclave page cache;
storing, by the processor, a key wrapping key in a first register in a key distribution engine, the first register accessible only by hardware;
generating, by an application being executed by the processor within the architecturally protected execution environment, a content encryption key;
generating content encrypted with the content encryption key;
generating an encrypted content encryption key by encrypting, using the key wrapping key, the content encryption key;
storing the encrypted content encryption key in a second register in the key distribution engine, the second register accessible by software; and
decrypting, by the key distribution engine, the encrypted content encryption key to generate a first decrypted content encryption key;
providing, by the key distribution engine, the first decrypted content encryption key to a first fixed-function endpoint;

receiving, by a configuration interface between the key distribution engine and the first fixed-function endpoint and a second fixed-function endpoint, an acknowledgement from the first fixed-function endpoint that the first fixed-function endpoint has received the first decrypted content encryption key;

receiving, by a state machine in the key distribution engine, the acknowledgement from the configuration interface before a transition to a state in which a second decrypted content encryption key is to be provided to a second fixed-function endpoint.

11. The method of claim 10, further comprising expanding, by key distribution engine, the key wrapping key into a plurality of round keys.

12. The method of claim 11, further comprising storing, by the key distribution engine, the plurality of round keys in a key bank.

13. The method of claim 12, wherein decrypting includes decrypting using the the plurality of round keys from the key bank.

14. The method of claim 13, further comprising storing, in a third register in the key distribution engine, a first indicator to trigger the decrypting, the third register accessible by software.

15. The method of claim 14, further comprising storing, in a fourth register in the key distribution engine, a second indicator to trigger the expanding, the fourth register accessible only by hardware.

16. An apparatus comprising:
hardware to implement an architecturally-protected execution environment by performing at least one of executing instructions residing in an enclave page cache and preventing an unauthorized access to the enclave page cache;
a first register in which to store a key wrapping key, the first register writable only by a processor during a reset process;
a second register in which to store an encrypted content encryption key, the second register accessible by software executing on the processor within the architecturally-protected execution environment;
a controller to control the generation of a first decrypted content encryption key by decrypting the encrypted content encryption key using the key wrapping key and to provide the first decrypted content encryption key to a first fixed-function endpoint; and
a state machine to receive an acknowledgement from the first fixed-function endpoint that the first fixed-function endpoint has received the first decrypted content encryption key before a transition to a state in which a second decrypted content encryption key is to be provided to a second fixed-function endpoint.

17. The apparatus of claim 16, further comprising a key expansion module to expand the key wrapping key into a plurality of round keys.

18. The apparatus of claim 17, further comprising a key bank in which to store the plurality of round keys.

19. The apparatus of claim 18, further comprising a crypto engine to decrypt the encrypted content encryption key with the plurality of round keys.

20. The apparatus of claim 19, further comprising:
a third register in which to store a first indicator to trigger the crypto engine to decrypt the encrypted content encryption key, the third register accessible by software; and
a fourth register in which to store a second indicator to trigger the key expansion module to expand the key wrapping key, the fourth register accessible only by hardware.

* * * * *